(12) United States Patent
Venkatesh et al.

(10) Patent No.: US 11,231,970 B2
(45) Date of Patent: Jan. 25, 2022

(54) INTELLIGENT APPLICATION PROGRAMMING INTERFACE (API) PROXY DESIGN SYSTEM

(71) Applicant: SAP SE, Walldorf (DE)

(72) Inventors: Sandeep Venkatesh, Bangalore (IN); Aditya Sriram, Mumbai (IN); Pallavi Mishra, Delhi (IN); Jyoti Sharma, Bangalore (IN)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 16/401,669

(22) Filed: May 2, 2019

(65) Prior Publication Data
US 2020/0348986 A1 Nov. 5, 2020

(51) Int. Cl.
*G06T 15/04* (2011.01)
*G06F 9/54* (2006.01)
*G06F 9/38* (2018.01)

(52) U.S. Cl.
CPC ............ *G06F 9/541* (2013.01); *G06F 9/3891* (2013.01)

(58) Field of Classification Search
None
See application file for complete search history.

(56) References Cited

U.S. PATENT DOCUMENTS

| 2007/0157010 | A1* | 7/2007 | Zenz ................... G06F 9/44505 713/1 |
| 2009/0319651 | A1* | 12/2009 | Fang ......................... G06F 9/54 709/223 |
| 2014/0278065 | A1* | 9/2014 | Ren .......................... G06T 17/00 701/454 |
| 2015/0128103 | A1* | 5/2015 | Stratton .................... G06F 8/36 717/100 |
| 2018/0329704 | A1* | 11/2018 | Laredo ..................... G06F 9/547 |
| 2019/0019104 | A1* | 1/2019 | Liu ........................... G06F 9/46 |
| 2020/0133744 | A1* | 4/2020 | MacLeod ............. G06K 9/6885 |

OTHER PUBLICATIONS

Tomasz G'orski et al. "Use Case API—design pattern for shared data" (Year: 2018).*

* cited by examiner

*Primary Examiner* — Doon Y Chow
*Assistant Examiner* — Abdou K Seye
(74) *Attorney, Agent, or Firm* — Buckley, Maschoff & Talwalkar LLC

(57) ABSTRACT

A method and system including an Application Programming Interface (API) proxy module; an API proxy processor in communication with the API proxy module and operative to execute processor-executable process steps to cause the system to: receive API development data, wherein the API data includes at least one of back-end data and use-case data; identify one or more API clusters that is similar to the received API development data; generate an API proxy template based on the identified one or more API clusters; and display the generated API proxy template to a client on a user interface. Numerous other aspects are provided.

20 Claims, 7 Drawing Sheets

INTELLIGENT APPLICATION PROGRAMMING INTERFACE (API) PROXY DESIGN SYSTEM

BACKGROUND

An Application Programming Interface (API) is an interface that makes it easy for one application to "consume" capabilities or data from another application. The API may provide the language and contract for how two systems interact. Each API has documentation and specifications which determine how information may be transferred. The API may define stable, simplified entry points to application logic and data. An API proxy is an interface to software developers who want to use backend services of a service provider. A traditional backend architecture includes at least an application server, web server and a database at a core. As such, the backend of an application determines the extent of data synchronization across platforms, as well as data storage capabilities, the ability to send notification messages and the capacity to support different HTTP methods. Rather than having the software developers consume those services directly, they may access them via the API proxy. The API proxy may decouple the application-facing API from the backend services.

An API management system may helps the software developer, via the API proxy, design an API for a given backend with a set of policies. A policy implements a specific, limited management function as part of a request/response flow, without the developer having to write any code. Conventionally, API management systems may provide a collection of policy templates, via the API proxy, that are generically created to fit a few use cases. These policy templates may be static and may not take into account performance aspects of API proxies.

Systems and methods are desired which support efficient and customized API proxy generation.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

When an API developer wants to implement a specific feature, they need to provide the code for that feature. An API developer ("developer") may look to an API management system to help the developers create the API. For example, the API management system may provide one or more policies to assist the developer. A policy is like a module that implements a specific, limited management function (e.g., configuration data) as part of the proxy request/response flow. Policies are designed to let the developer add common types of management capabilities to an API easily and reliably. Policies provide features like secure, rate-limiting, transformation, and mediation capabilities, saving the developer from having to code and maintain this functionality on their own. Policies control API behavior without writing any code.

The API management system may provide the policies to the developer through the use of an API proxy, for example. As described above, the API proxy is the interface for software developers who want to use backend services of a service provider (e.g., API management system).

Conventionally, a lifecycle of an API proxy may include two endpoints: a proxy endpoint and a target end point. An endpoint is one end of a communication channel. For APIs, an endpoint may include a URL of a server or service. Each endpoint is the location from which APIs can access the resources they need to carry out their function. APIs work using "requests" and "responses." When an API requests information from a web application or web server, it will receive a response. The place that APIs send requests and where the resource lives, is called an endpoint.

Figure 1:
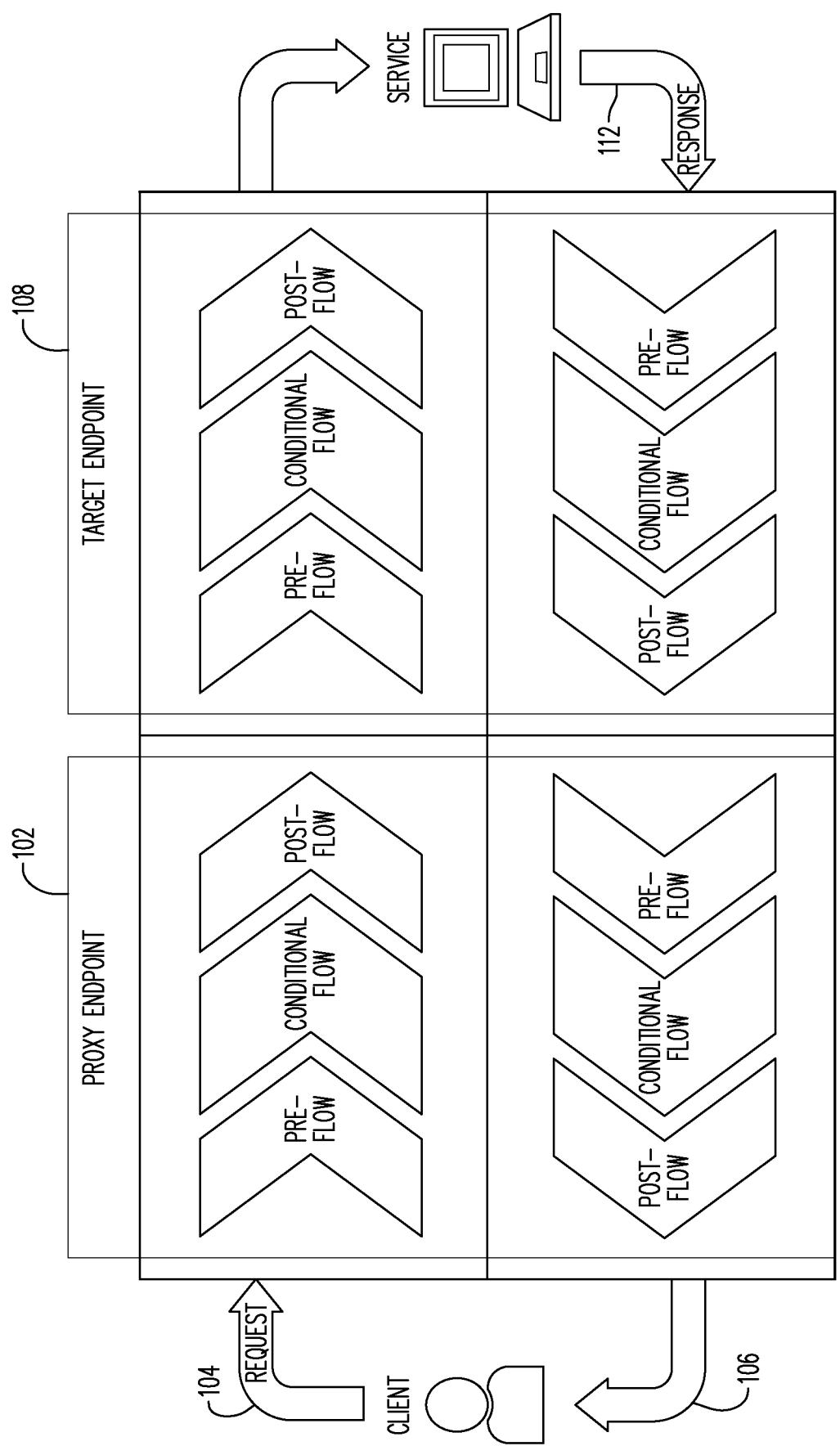
FIG. 1 is a block diagram of proxy and target endpoints.
Figure 2:
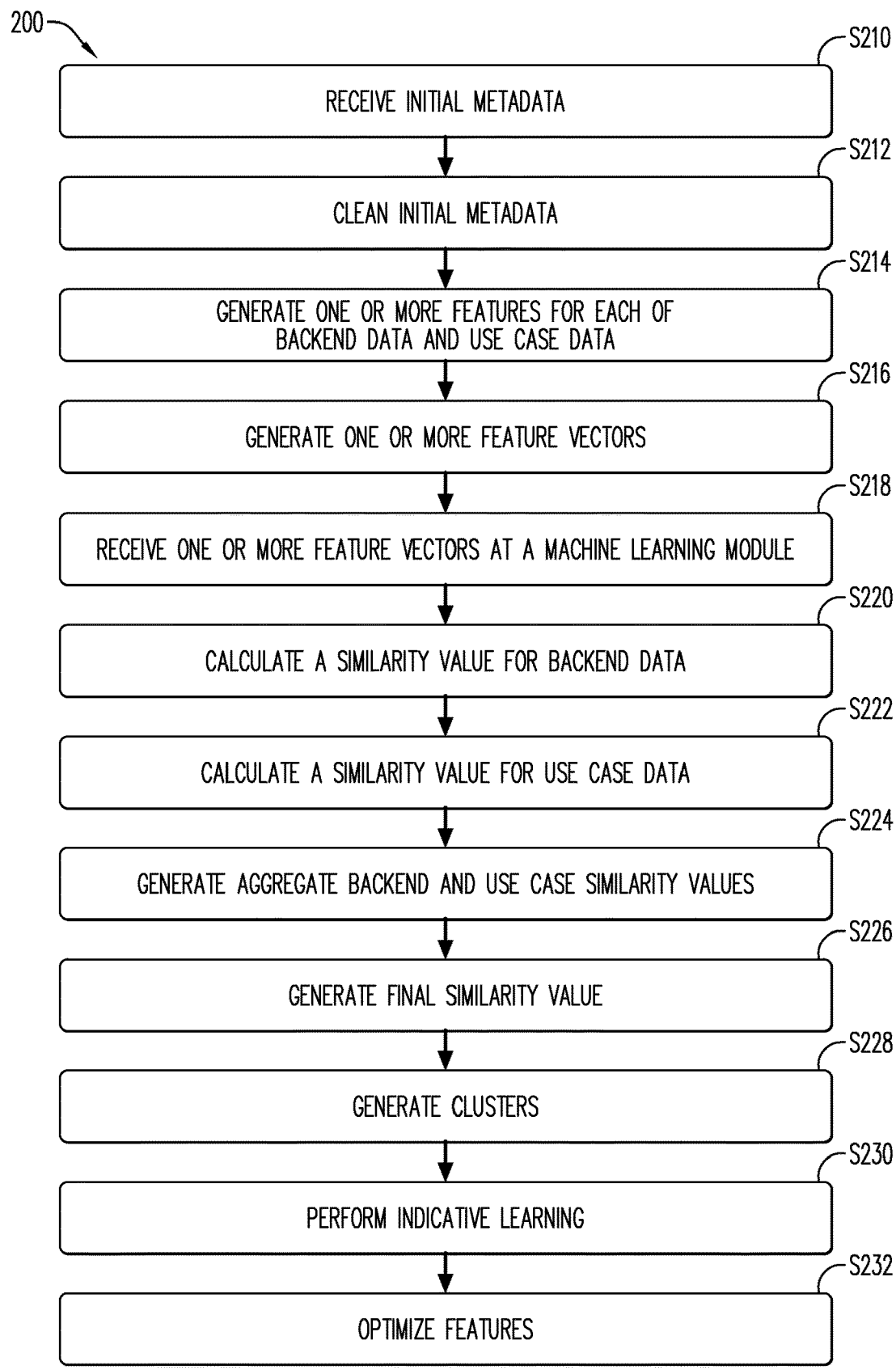
FIG. 2 is a flow diagram according to some embodiments.
Figure 3:
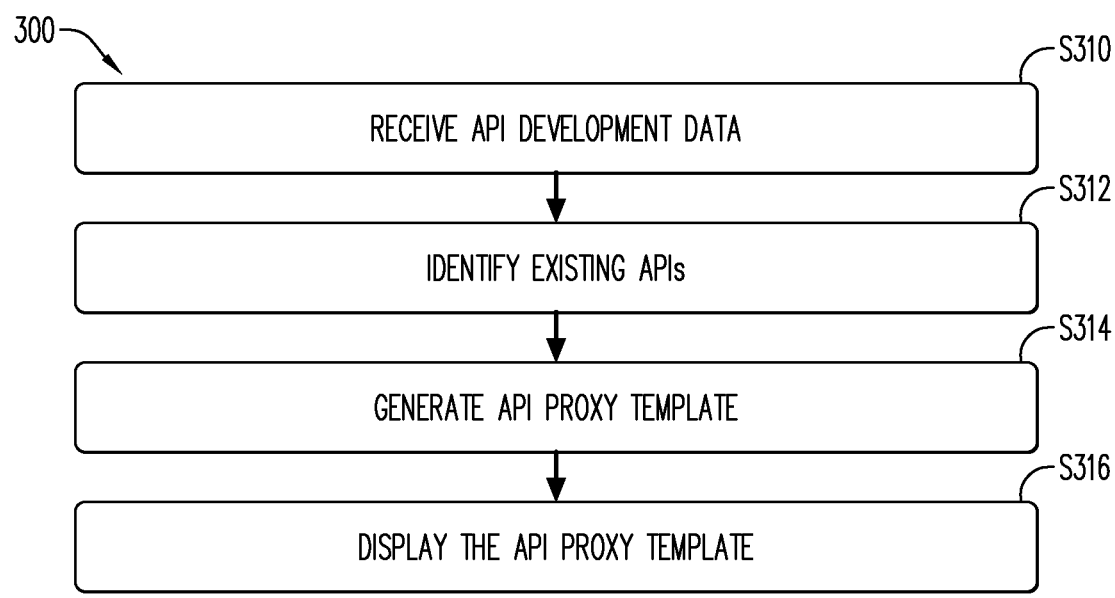
FIG. 3 is a flow diagram according to some embodiments.

The proxy endpoint and the target endpoint may define a pipeline to process request and response messages (e.g., control and channel how the API behaves and the information it carries). As shown in FIG. 1, each request or response flow may be subdivided into: a pre-flow (this flow is always executed as the first step in the segment where it is applied); a post-flow (this flow is always executed as the last step in the segment where it is applied, after executing any conditional flows); and a conditional flow (a condition associated to a flow). A flow may contain one or more conditions. Conventionally, only the first condition met is executed.

As shown in FIG. 1, the API proxy endpoint 102, may receive an incoming request 104 and output an outgoing response 106. The incoming request 104 may include requests from external sources (e.g., user applications, Business to Business (B2B) application, a mobile application, any client which may make an API call, etc.) to the API proxy 102 residing on the API management system. The outgoing response 106 may include a data response sent from the API proxy residing on the API management system to the original request source. The target endpoint 108 (the actual backend) may also receive a request flow, represented by the pre-flow, conditional flow and post-flow at the target endpoint 108. The target endpoint 108 may also include an outgoing response 112. The request flow may include requests from the API proxy endpoint 104 on the API management to the target endpoint 108. The outgoing response from the target endpoint 112 may be a data response from the target endpoint 108 to the API proxy endpoint 102 on the API management system, in response to the request received from the API proxy. Different policies provided by the API management system may be suited for different flows in the API proxy lifecycle. A policy may be a step that executes a given operation during runtime. It is noted that any application programming model may include a way to control the flow of processing. In an API proxy, that control (e.g., what happens and when) may be via flows. Logic, condition statements, error handling, etc. may be added to the flow. As used herein, a "flow" refers to sequential stages along the API request processing path. As a non-exhaustive example, to verify an API key, proxy logic may be added as a step in the sequence specified by a flow. When a condition to define whether and when logic executives, the condition may be added to a flow. As another example, there may be certain classes of policies that may be best applied to the API proxy endpoint 102, including but not limited to Authentication, Data throttling and Treat Protection, as these aspects may be handled by the API management system before the request may be routed to the backend. Additionally, Statistics and Analytic collections may be completed on the API proxy endpoint 102 per the response, to gather data only after the entire process has been completed. On the other hand, policies that deal with specific routing may be placed on the Target Endpoint 108 to be triggered after the destination for the output has been determined. Some policies may be applied in either the API proxy endpoint 102 or the Target endpoint 108 and may be determined by a use-case. As used herein, a "use case" refers to the actions or steps, defining interactions between the user and the system to achieve a specific goal or result; use cases provide an example API that tells users how to obtain that end result. It is noted that the performance of the API proxy may rely on which flow the policy is attached to. As used herein, "performance of the API proxy" may refer to how fast or slow the API returns data to a calling client application.

Conventionally, the API management system may provide a policy template to the developer. The policy template may include a series of policies with default configuration that may allow an API developer to create an API easily, and may allow the developer to enter configuration information for their backend, per the template, to generate the API for their customers. However, this policy template may be static, and may not be easily customizable to the needs of different users. For example, the API management system may have to manually customize the template for the developer based on the developer's individual needs. This manual process may be time consuming. Additionally, a new tenant on the API management system may not be aware of how to use these policies and how they may customize these configurations.

It is also noted that different users may have different businesses, but may have some APIs that are similar/the same. One user may have implemented an API that may be helpful to another user, but the users do not have access to all APIs in the system, since the API management system may have implemented security measures to protect the individual user's data such as, a secure multitenancy model with the API proxy database, or any other security measure.

Consider the situation where the user (e.g., a client) has an API that returns data about weather reports. It is noted that weather results may not have a drastic change in a span of a few minutes. The client is assuming to have traffic, via the API, of 500 Transactions Per Second (TPS). This may translate to a large number of backend calls. To improve performance and limit spikes at the backend, the user may use a Response Cache Policy attached to a Proxy Request Flow and a Response Flow. Such a use case may be applicable to any situation where backed data used by the API is updated only periodically. However, with current security measures, the other clients are not aware of this API.

Another situation for consideration where it may be helpful to the developer to have access to other API policy data is one in which a developer includes policies in Flows which may have an adverse effect on the performance of the flow. These policy/flows may be termed "anti-patterns" or "wrongway of using a policy".

A non-exhaustive example is when a developer to have accesses trying to log data from the API proxy to a third party server using a JavaScript policy. The JavaScript policy allows a user to write Logic in the language JavaScript. Since there are predefined objects like "request" and "response" present in API Management JavaScript Model, it may be easy for a developer to use these to get log data to debug problems. The developer may use the timestamps/log information of Client Calls, Header passed, form programs, Query params used, dynamic variables etc. to debug problems or for later reference. This information about the API request may be logged locally on a Virtual Machine running the application or to a third party log management server (e.g., SumoLogic, Splunk, Loggly). Though this may appear as an easy solution to Log data, this may be an anti-pattern or a performance bottleneck, since much of the logging processing goes into calculating and populating these values during request/response processing, thereby adding to the processing time, thereby increasing overall latencies. As described below, one or more embodiments may resolve these anti-patterns as the embodiments may have access to other customer's that have already faced these issues.

Instead of the anti-pattern, it may be more efficient for the developer to use a Message Logging policy to transfer/log data to log servers or third party log management servers. An advantage of the Message Logging policy is that it may be defined in the post client flow, which is executed after the response is sent back to the requesting client. However, conventionally, the developer may not discover the Message Logging policy without significant research through documentation and/or exploration of policies in a hit and trial approach.

One or more embodiments provide for an API proxy module that helps developers in designing high preferment API proxies by providing real-time suggestions based on past learning experiences. The API proxy module may collect data from existing customers in a multi-tenant database, without breaching security and privacy of customer data. The API proxy module may then use this collected data to make suggestions to customers via an on-the-fly generated customized API proxy template. One or more embodiments may provide for the API proxy module to create an intelligent API template by leveraging 1. best practices from the data of the entire multi-tenant database (not just the data for the client requesting the API) and 2. Restricting the accessible data-based similarities per machine learning. In one or more embodiments, the API proxy module may cluster existing API proxies and policy implementation which may be used by others (e.g., new clients developing APIs for use cases that may be similar). The API proxy module may also, in one or more embodiments, store statistical data related to performance (e.g., good and bad performing) of policies, and then may notify clients about the performance.

Figure 4:
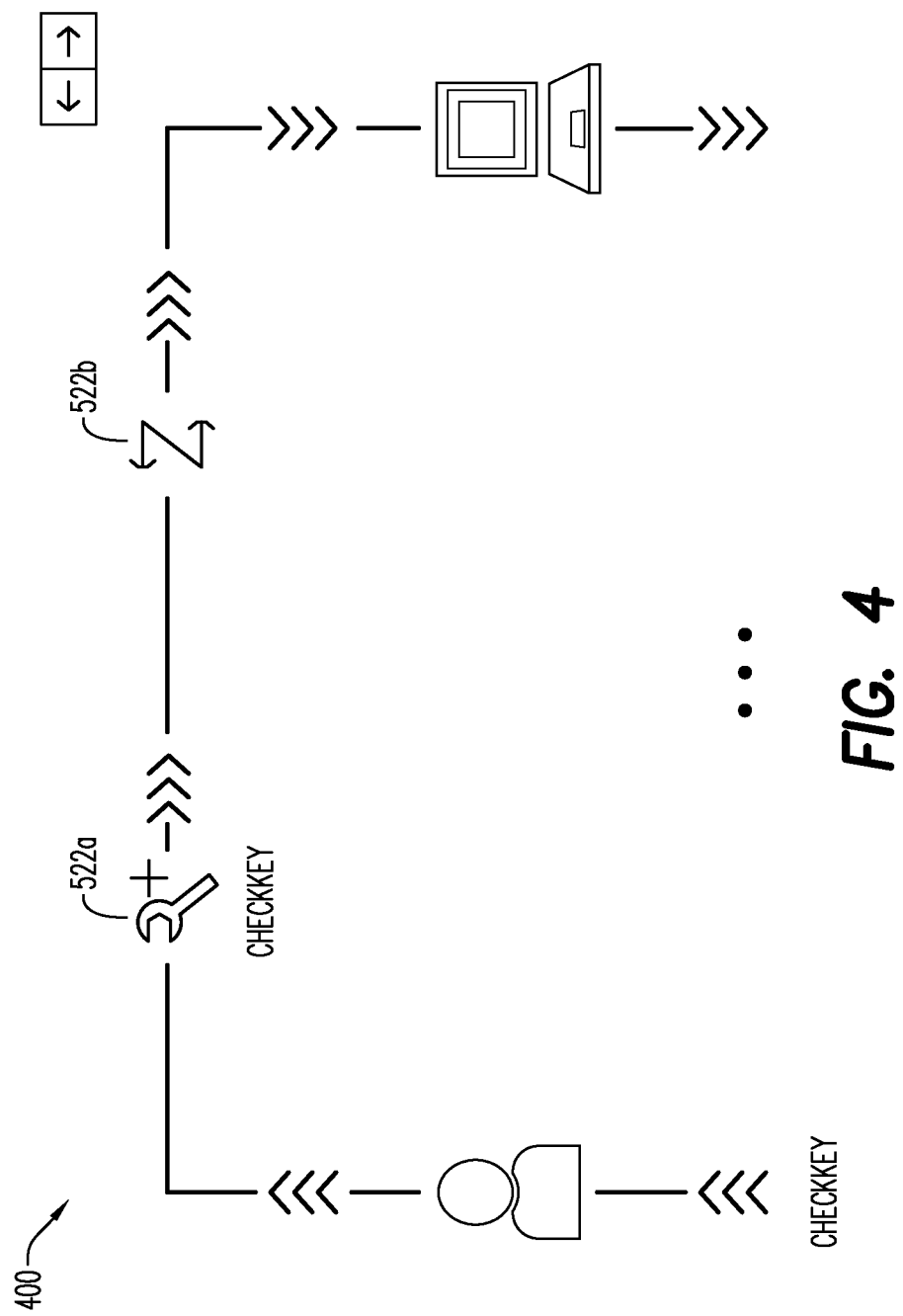
FIG. 4 is a block diagram of a non-exhaustive example according to some embodiments.
Figure 5:
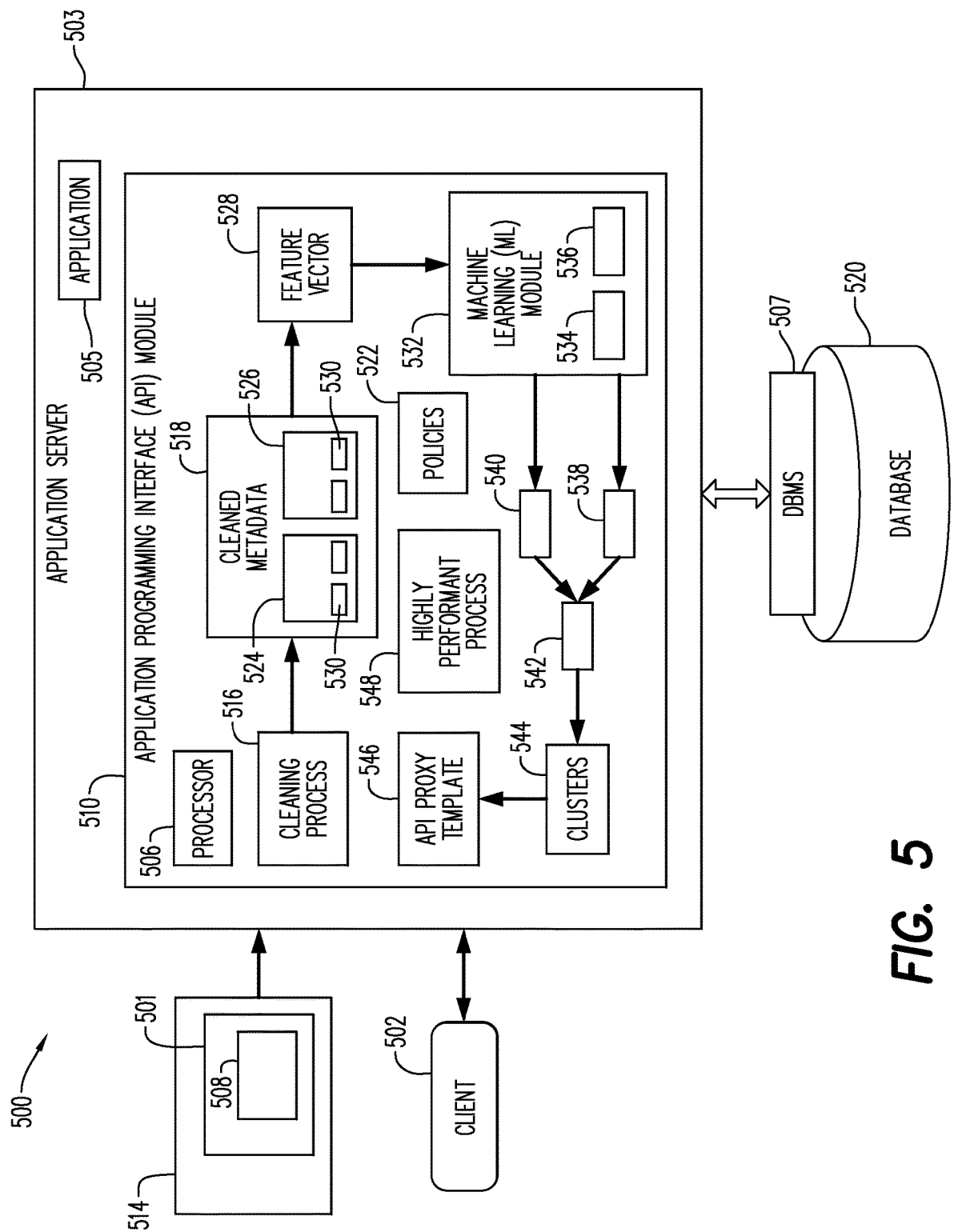
FIG. 5 is a block diagram of a system architecture according to some embodiments.

FIGS. 2-5 include a flow diagram of a process 200/300 (FIGS. 2/3) for clustering similar APIs together and for generating an API proxy template 546 (FIG. 5), respectively according to some embodiments, with an API management system 500 (FIG. 5). The API proxy template 546 may be used by the developer to create an API for their client. Process 200/300 may be executed by a processor 506 (FIG. 5) according to some embodiments. In one or more embodiments, the processor 506 may be conditioned to perform the process 200/300, such that a processor 506 (FIG. 5) of the system 500 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, an API 501 including initial metadata 508 is received at an Application Programming Interface (API) proxy module 510. The initial metadata 508 may be related to one or more existing APIs. In one or more embodiments, each existing API may be associated with a use case 514. The relationship between the existing API and use case may be 1:1 or 1:more than one (and vice versa). The metadata 508 may be cleaned via a cleaning process 516 in S212 to remove all customer privacy sensitive information including, but not limited to, API keys, Oath Tokens, Backend URLs, etc. As a non-exhaustive example of the cleaning process 516, information like Customer Backend URLs, Application Keys and other information that does not play any role in calculating the similarity index and developing the templates may be removed ("cleaned") and not stored in the database which may be used for these similarity index and template activities. Any suitable data cleaning method may be used. The cleaned metadata 518 may include, but is not limited to, structural information for each of the APIs 501 (e.g., how one or more policies 522 are attached to the API, the order in which the one or more policies 522 are attached to the API, performance numbers of each of the API timing and the policy timings), which includes both backend data 524 and use case data 526. Next in S214, the API proxy module 510 may parse the cleaned metadata 518 to generate one or more features for each of the backend data 524 and the use case data 526 associated with each API having cleaned metadata. Then in S216, the API proxy module 510 may generate one or more feature vectors 528 for the one or more features 530. In some embodiments, a feature vector 528 may be created for each API. Examples of the features 530 include, but are not limited to, for use case data 526: geographic location in which the API was used, API browser; for backend data 524: nature of the backend (content-type accepted and the target content type required), expected transactions per second (TPS), authentication type, etc. As a non-exhaustive example, 90 features may be recorded for each API, and may be used to form the feature vector 528. More or less features may be used to form the feature vector.

Then in S218 a machine learning (ML) module 532 may receive the one or more feature vectors 528, for clustering thereof, described further below. In one or more embodiments, the feature vectors may be associated with an API such that APIs for each client may be clustered with APIs for other clients. It is noted that one client may have APIs in different clusters. In one or more embodiments, the ML module 532 may use a multi-step hybrid collaborative filtering process 534 to cluster the feature vectors 528. Other suitable cluster processes may be used. As described below, the clustering may be determined by computing similarity values across two criteria: backend data 524 and use case data 526.

To cluster the feature vectors 528, the machine learning (ML) module 532 may use unsupervised learning ("clustering") (e.g., ML module finds shared characteristics by which to group data when categories are not specified.)

In one or more embodiments, the ML module 532 may, in S220, calculate a similarity value 536 for each feature in the backend data 524 (e.g. nature of backend), where the similarity value is calculated for a given feature in backend data as compared to other features is across all APIs in existing metadata 508, using any suitable similarity process.

As a non-exhaustive example, consider a scenario with three customers—C1, C2 and C3—with Backend Feature vectors—B1, B2, B3 and B4, where the similarity process is a Cosine Similarity process, and then the Cosine Similarity Matrix is constructed as follows:

| Bi-Bj | B1 | B2 | B3 | B4 |
| --- | --- | --- | --- | --- |
| B1 | X | a | b | c |
| B2 | a | X |   | h |
| B3 | b | f | X | k |
| B4 | e | d | g | X |

The formula to calculate Cosine Similarity between two Backend Bi and Bj is calculated as:

$$\frac{\sum_{i=1}^{n} Bi \times Bj}{\sqrt{\sum_{i=1}^{n} Bi^2} \times \sqrt{\sum_{i=1}^{n} Bj^2}}$$

Examples of similarity processes include, but are not limited to, Cosine Similarity, Euclidean Distance, Manhattan Distance, Jaccard Similarity. Then in S222, the ML module 532 may calculate a similarity value 536 for each feature in the use case data 526, where the similarity is calculated for a given feature in use case data as compared to other features across all APIs in existing metadata 508, using any suitable similarity process.

After the similarity value is computed for each feature in the backend data 524 and the use case data 526, the backend data similarity values are aggregated for each API to generate an aggregated backend similarity value 538 for the API, and the similarity values are aggregated for each API to generate an aggregated use case similarity 540 in S224. In one or more embodiments, the aggregation includes all similarity values (either backend or use case) for a given API.

A final similarity value 542 is then generated in S226 for each existing API, based on a product of the aggregated back end similarity value and the aggregated use case similarity value. It is noted that the final similarity value 542 may be used to determine whether an API should be clustered with other APIs, instead of using one of the aggregated backend similarity value or the aggregated use case similarity value. The use of both aggregate values may enhance relevance and account for scenarios where two customers may have very similar backend data (contributing to a high aggregated backend similarity score), but their use cases may be largely different (indicating a lower aggregated use case similarity score). The final similarity value 542 may provide a relatively reasonable similarity value which is neither too high nor too low. As a non-exhaustive example, Client A and Client B may have high aggregated backend similarity value, but Client A wants a JSON response, while Client B wants an XML response, leading to a low final similarity value.

Next, in S228 one or more clusters 544 are generated based on a comparison of the final similarity value 542 for each API to a defined threshold. As a non-exhaustive example, if $U_i$ is a Use case (e.g., a proxy with specific set of policies), a similarity value (S) for Backend (B) and Use case (U) is calculated as:

$$S_{ij}=B_{ij}*U_{ij}$$

The final similarity values for each API by then be clustered 544 based on the final similarity score greater than or equal to the defined threshold.

Based on the defined threshold, similar customers are clustered together.

The cluster 544 may include one or more APIs associated with one or more clients, where the APIs include a similar final similarity value 544 per the comparison to the defined threshold.

After the APIs 501 are clustered, the ML module 532 may perform inductive learning in S230 to obtain a correct order and types of policies to be used that fits a particular cluster of APIs. A non-exhaustive example includes 3 API proxies of 3 customers; and 6 policies: P1. Quota, P2. Raise fault, P3. Spike Arrest, P4. Assign Message, P5. Key Value Maps and P6. Extract Variables. All these policies have functionalities, so for 3 proxies, a feature vector may be created based on whether the policy is present in the API proxy or not. Continuing with the example:

API 1: P1, P3, P5; API 2: P1, P3, P6; and API 3: P4, P2, P5, which may result in the following feature vector:

API 1 (customer 1): [1, 0, 1, 0, 1, 0]
API 2 (customer 2): [1, 0, 1, 0, 0, 1]
API 3 (customer 3): [0, 1, 0, 1, 1. 0]

In this example, every customer has only 1 proxy, so the feature vector for API is the same as the feature vector for the customer. However, the feature vector may be an aggregate of all the feature vectors of all the APIs. As such, to create a Use case matrix, cosine similarity may be used, as described above. It is noted that cosine similarity is a non-exhaustive example of similarity measures. In one or more embodiments, when other similarity measures are used, the same procedure described above may be followed with the difference that a formula for that other similarity measure may be used instead of the cosine similarity formula.

Next, the features of the APIs may be optimized in S232.

In one or more embodiments, the API proxy module 510 may execute a highly performant process 548 to identify highly performant APIs within each cluster, which may then be shared across the other users having APIs within that cluster. In one or more embodiments, the identified highly performant API may be shared with users outside the cluster to which it is included. A highly performant API may be one in which response time metrics for that API are faster than response time metrics for other APIs within the cluster. In one or more embodiments, response times of each API may be stored in the data store 520. In one or more embodiments, the response time data may be recorded or stored for each policy. In one or more embodiments, the response time data may be used to determine the threshold values described above. The threshold values may come from trials and/or multiple iterations.

FIG. 4 provides a non-exhaustive example 400 of feature optimization. A given API 501 may have two attached policies—CheckKey policy 522a and SetHeader policy 522b (FIG. 4). The response time for this API 501 was 1.2 seconds. Of this 1.2 seconds, the CheckKey policy 522a took 50 milliseconds to execute and the SetHeader policy 522b took 800 milliseconds. The SetHeader policy 522b is having an adverse effect on response time of the API, as it takes 40 times longer than the CheckKey policy 522a. In one or more embodiments, the API proxy module 510 may identify another API 501 in the cluster 544 with at least one of: the same policies but assembled differently, making for a quicker response time, or different policies that accomplish a same task, but faster.

Figure 7:
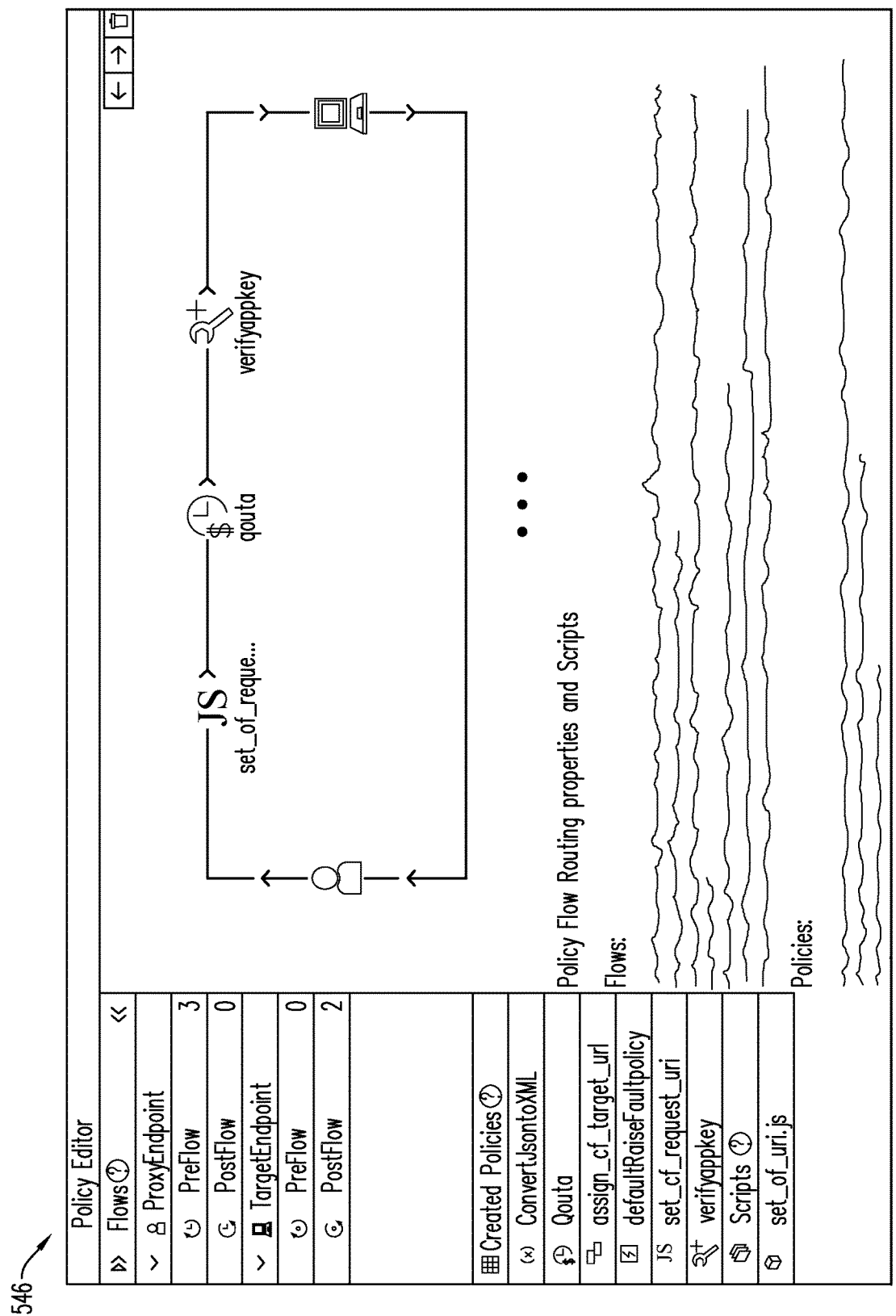
FIG. 7 is a non-exhaustive example of an API template according to some embodiments.

Next, the API proxy module 510 may generate one or more API proxy templates 546 (FIG. 7) that each correspond to a given cluster 544. For example, API Proxy Template 1 may include a Basic Authorization Policy, a Response Cache, and Message Logging; while API Proxy Template 2 may include an OAuth2, a JavaScript Policy and a Spike Arrest Policy. Other suitable items may be included in the template.

Initially, at S310, the API proxy module 510 receives API development data 550 from a client 502. The client 502 may be one of an application/API developer or a customer.

In one or more embodiments, the API development data 550 may include backend data 524 and use case data 526 for use in the generation of the API proxy template 546. The backend data 524 and use case data 526 includes but is not limited to: 1. the content-accepted by the Backend (e.g., application/j son application/xml), and the target content type for the API (e.g., application/j son application/xml); 2. expected traffic in TPS or any other suitable metric; 3. the authentication type for the API (OAuth, SAML, APIKEYS, etc.); and 4. Response types, formats, period of change for the endpoint response etc. The client 502 may input this data via a user interface (not shown) with at least one of user entry fields, drop-down menus, etc.

In one or more embodiments, when the client 502 is a new user (i.e., does not have any previously-stored APIs in the storage), the API proxy module 510 may only receive backend data 524 from this client. When the client 502 is a repeat-user (i.e., has previously-stored APIs in storage), the API proxy module 510 may receive both backend data 524 and use case data 526.

Then at S312, the API proxy module 510 identifies one or more existing APIs based on the received API development data 500. In one or more embodiments, when the client 502 is a new client, the identification may be based on a comparison of the received API development data to the feature vectors associated with the existing APIs. When the client is a repeat user, the API proxy module 510 may first identify the one or more clusters 544 in which the client's previously-stored APIs are included, and then identify the existing APIs therein. Next, in S314, the API proxy module 510 may generate one or more API proxy templates 546 that best match the received API development data 546 per a threshold value or range of values. It is noted that, in one or more embodiments, when K-means clustering is used to identify the clusters, a cluster center may change with every iteration, meaning that the similarity score may not be used in those situations. The API proxy template 546 may then be displayed to the client 502 on a user interface in S316. The client 502 may then choose to use the API proxy template as it is, make changes to the API proxy template as needed, or discard the API proxy template.

FIG. 5 is a block diagram of system architecture 500 according to some embodiments. Embodiments are not limited to architecture 500 or to a three-tier database architecture.

Architecture 500 includes an application server 503, an application 505, an API proxy module 510, a client 502, a data store 520 (e.g., database) and a database management system or service (DBMS) 507. In one or more embodiments, the API proxy module 510 may reside on the application server 503. Applications 505 may comprise server-side executable program code (e.g., compiled code, scripts, etc.) executing within application server 503 to receive queries from clients and provide results to clients based on data of datastore 520 per the DBMS 507.

Application server 503 provides any suitable interfaces through which clients 502 may communicate with the API proxy module 510 or applications 505 executing on application server 503.

One or more applications 505 executing on server 503 may communicate with DBMS 507 using database management interfaces such as, but not limited to, Open Database Connectivity (ODBC) and Java Database Connectivity (JDBC) interfaces. These types of applications 505 may use Structured Query Language (SQL) to manage and query data stored in database 520.

DBMS 507 serves requests to retrieve and/or modify data of database 520, and also performs administrative and management functions. Such functions may include snapshot and backup management, indexing, optimization, garbage collection, and/or any other database functions that are or become known. DBMS 507 may also provide application logic, such as database procedures and/or calculations, according to some embodiments. This application logic may comprise scripts, functional libraries and/or compiled program code.

Application server 503 may be separated from, or closely integrated with, DBMS 507. A closely-integrated application server 503 may enable execution of server applications completely on the database platform, without the need for an additional application server. For example, according to some embodiments, application server 503 provides a comprehensive set of embedded services which provide end-to-end support for Web-based applications. The services may include a lightweight web server, configurable support for OData, server-side JavaScript execution and access to SQL and SQLScript.

Application server 503 may provide application services (e.g., via functional libraries) which applications 505 may use to manage and query the data of database 520. The application services can be used to expose the database data model, with its tables, hierarchies, views and database procedures, to clients. In addition to exposing the data model, application server 503 may host system services such as a search service.

Database 520 may store data used by at least one of: applications 505 and the API proxy module 510. For example, database 520 may store clusters of APIs.

Database 520 may comprise any query-responsive data source or sources that are or become known, including but not limited to a structured-query language (SQL) relational database management system. Database 520 may comprise a relational database, a multi-dimensional database, an eXtendable Markup Language (XML) document, or any other data storage system storing structured and/or unstructured data. The data of database 520 may be distributed among several relational databases, dimensional databases, and/or other data sources. Embodiments are not limited to any number or types of data sources.

In some embodiments, the data of database 520 may comprise one or more of conventional tabular data, row-based data, column-based data, and object-based data. Moreover, the data may be indexed and/or selectively replicated in an index to allow fast searching and retrieval thereof. Database 520 may support multi-tenancy to separately support multiple unrelated clients by providing multiple logical database systems which are programmatically isolated from one another.

Database 520 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 6:
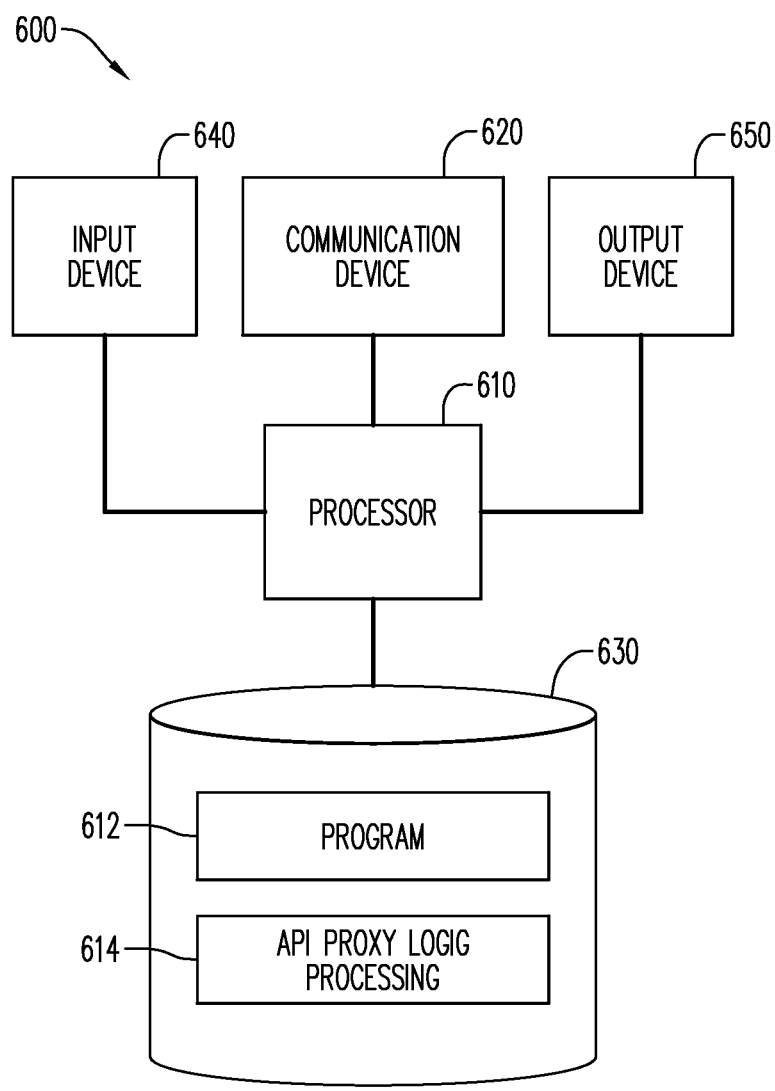
FIG. 6 is a block diagram of a system according to some embodiments.

FIG. 6 is a block diagram of apparatus 600 according to some embodiments. Apparatus 600 may comprise a general—or special—purpose computing apparatus and may execute program code to perform any of the functions described herein. Apparatus 600 may comprise an implementation of one or more elements of system 500. Apparatus 600 may include other unshown elements according to some embodiments.

Apparatus 600 may comprise a general—or special—purpose computing apparatus and may execute program code to perform any of the functions described herein. Apparatus 600 may comprise an implementation of one or more elements of system 500. Apparatus 600 may include other unshown elements according to some embodiments.

Apparatus 600 includes an API proxy processor 610 operatively coupled to communication device 620, data storage device 630, one or more input devices 640, one or more output devices 650 and memory 660. Communication device 620 may facilitate communication with external devices, such as application server 503. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device/memory 630 may comprise any device, including combinations of magnetic storage devices (e.g., magnetic tape, hard disk drives and flash memory), optical storage devices, Read Only Memory (ROM) devices, Random Access Memory (RAM) etc.

The storage device 630 stores a program 612 and/or API proxy platform logic 614 for controlling the processor 610. It is noted that program 612 and/or API proxy platform logic 614 may also be stored and executed from an application server or from any other environment (e.g., software architecture) that can execute software instructions. The processor 610 performs instructions of the programs 612, 614, and thereby operates in accordance with any of the embodiments described herein, including but not limited to processes 200/300. The executable instructions of the programs 612, 614 represent the executable instructions of the software architecture, including implementation of the methods, modules, subsystems and components and so forth described herein and may also include memory and/or storage modules, etc.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

The foregoing diagrams represent logical architectures for describing processes according to some embodiments, and actual implementations may include more, or different, components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 500 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   an Application Programming Interface (API) proxy module;
   an API proxy processor in communication with the API proxy module and operative to execute processor-executable process steps to cause the system to:
   generate a final similarity value for each API of one or more existing APIs, wherein the final similarity value is a product of an aggregated backend similarity value and an aggregated use case similarity value;
   receive API development data, wherein the API development data includes at least one of backend data and use case data, and the API development data is data used by the API proxy module to generate an API proxy template;
   identify one or more existing API clusters that is similar to the received API development data, wherein each existing API cluster includes at least one of the one or more existing APIs having a similar final similarity value as compared to a defined threshold, the final similarity value is indicative of a degree of similarity between backend data and use case data;
   generate an API proxy template based on the identified one or more existing API clusters; and
   display the generated API proxy template to a client on a user interface.

2. The system of claim 1, wherein the API development data includes at least one of: content accepted by a backend, a target content type, expected traffic, authentication type, response type, response format, period of change for an endpoint response.

3. The system of claim 1, wherein each of the one or more existing API clusters include one or more existing APIs.

4. The system of claim 3, wherein each of the existing APIs includes one or more feature vectors.

5. The system of claim 4, wherein each feature vector includes one or more features of the existing API.

6. The system of claim 1, wherein the similarity of the final similarity value is based on one of a threshold value and a range of threshold values.

7. The system of claim 1, wherein the API proxy template is an interface to one or more backend services.

8. The system of claim 7, wherein the one or more backend services include at least one of: security, analytics, rate limiting, transformations, quotas, cross-origin resource sharing (CORS), caching and persistence, and fault handling.

9. The system of claim 1, wherein the client is a developer.

10. The system of claim 1, wherein:
    each similarity value in the aggregated backend similarity value is calculated for a given feature in backend data as compared to other features across all APIs in the one or more existing APIs; and
    each similarity value in the aggregated use case similarity value is calculated for a given feature in use case data as compared to other features across all APIs in the one or more existing APIs.

11. A method comprising:
    generating a final similarity value for each API of one or more existing APIs, wherein the final similarity value is a product of an aggregated backend similarity value and an aggregated use case similarity value;
    receiving API development data, wherein the API development data includes at least one of backend data and use case data, and the API development data is data used to generate an API proxy template;
    identifying one or more existing API clusters that is similar to the received API development data, wherein each existing API cluster includes at least one of the one or more existing APIs having a similar final similarity value as compared to a defined threshold, the final similarity value is indicative of a degree of similarity between backend data and use case data;
    generating an API proxy template based on the identified one or more existing API clusters; and
    displaying the generated API proxy template to a client on a user interface.

12. The method of claim 11, further comprising prior to receiving API development data:
    generating the one or more existing API clusters.

13. The method of claim 12, wherein each of the one or more existing API clusters include one or more existing APIs.

14. The method of claim 13, wherein generating the existing one or more clusters further comprises:

comparing the final similarity value for each existing API to a threshold value.

15. The method of claim 13, wherein each of the existing APIs includes one or more feature vectors.

16. The method of claim 15, wherein each feature vector includes one or more features of the existing API.

17. The method of claim 11, wherein the API development data includes at least one of: content accepted by a backend, a target content type, expected traffic, authentication type, response type, response format, period of change for an endpoint response.

18. A non-transitory computer-readable medium storing instructions that, when executed by a computer processor, cause the computer processor to perform a method comprising:

generating a final similarity value for each API of one or more existing APIs, wherein the final similarity value is a product of an aggregated backend similarity value and an aggregated use case similarity value;

receiving API development data, wherein the API development data includes at least one of backend data and use case data, and the API development data is data used by the API proxy module to generate an API proxy template;

identifying one or more existing API clusters that is similar to the received API development data, wherein each existing API cluster includes at least one of the one or more existing APIs having a similar final similarity value as compared to a defined threshold, the final similarity value is indicative of a degree of similarity between backend data and use case data;

generating an API proxy template based on the identified one or more existing API clusters; and displaying the generated API proxy template to a client on a user interface.

19. The medium of claim 18, further comprising prior to receiving API development data:

generating the one or more existing API clusters.

20. The medium of claim 18, wherein the API development data includes at least one of: content accepted by a backend, a target content type, expected traffic, authentication type, response type, response format, period of change for an endpoint response.

* * * * *